July 17, 1962 W. A. THORNTON, JR 3,044,902
METHOD OF FORMING FILMS OF ELECTROLUMINESCENT PHOSPHOR
Filed Sept. 3, 1959 2 Sheets-Sheet 1
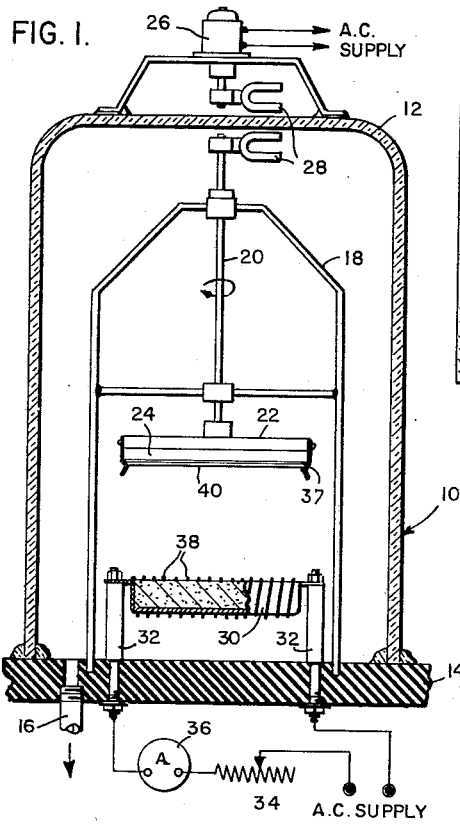
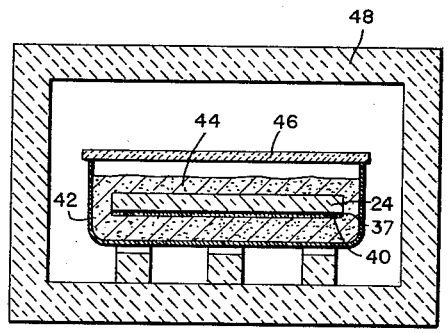
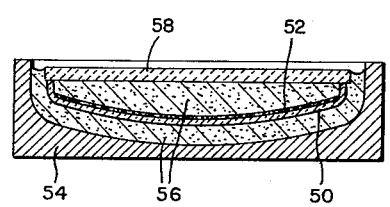
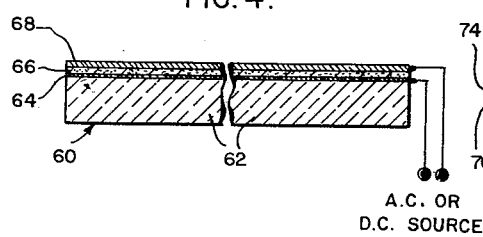
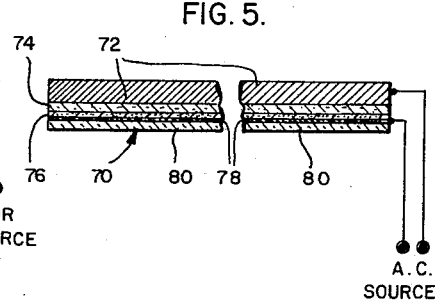
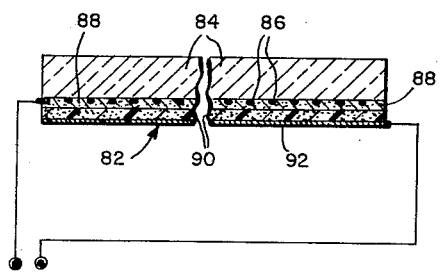
INVENTOR
WILLIAM A. THORNTON, Jr.
BY *W. D. Palmer*
ATTORNEY July 17, 1962  W. A. THORNTON, JR  3,044,902
METHOD OF FORMING FILMS OF ELECTROLUMINESCENT PHOSPHOR
Filed Sept. 3, 1959  2 Sheets-Sheet 2

INVENTOR
WILLIAM A. THORNTON, Jr.

BY  W. D. Palmer
ATTORNEY

United States Patent Office 3,044,902
Patented July 17, 1962

3,044,902
METHOD OF FORMING FILMS OF ELECTRO-
LUMINESCENT PHOSPHOR
William A. Thornton, Jr., Cranford, N.J., assignor to
Westinghouse Electric Corporation, East Pittsburgh,
Pa., a corporation of Pennsylvania
Filed Sept. 3, 1959, Ser. No. 837,988
12 Claims. (Cl. 117—215)

This invention relates to luminescent material and, more particularly, to an improved method for forming thin films of luminescent material and the product resulting therefrom.

Luminescent material in thin film form has many advantages over the customary powder layer form in which such material is normally used. In the case of cathodoluminescent materials, thin generally-transparent films of cathodoluminescent phosphor are advantageous in that a high degree of resolution can be obtained and in addition, the cathode ray trace can be observed when the level of surrounding light is quite high, in contrast to the conventional CRT screen which incorporates powder phosphor material.

With respect to excitation by ultraviolet radiations, thin films of so-called photoluminescent material have distinct advantages for some applications. As an example, the usual color-corrected high-pressure mercury-vapor lamps incorporate a coating of powdered phosphor on the inner surface of the outer envelope, in order to convert unused ultraviolet radiations into longwave visible radiations to color correct the visible output of the mercury arc. Such lamps normally are not used in the usual reflecting fixtures, however, since the light-diffusing powder phosphor coating acts as a greatly enlarged light source and impairs the optical efficiency of the reflector and lens system. If such color-correcting phosphors could be applied to the inner surface of the outer envelope as substantially transparent films, the visible radiations emitted by the mercury arc would not be appreciably scattered by the phosphor coating, so that the optical efficiency of the lens and reflector system would not be impaired.

With respect to electroluminescence, thin films of electroluminescent phosphor material have many useful applications. As one example, it is desirable to operate electroluminescent lamps from a standard house voltage supply of 120 volts—60 cycles. The usual electroluminescent lamps are not as bright as desired under such excitation, inasmuch as the phosphor is normally mixed with a plastic or glass dielectric material. This serves to reduce the effective field which can be applied across the phosphor material, since the phosphor-dielectric layer must be made relatively thick and a substantial portion of the applied field is impressed across the embedding dielectric material. The resulting reduced field limits the light output which can be realized from the usual electroluminescent lamps operated on standard line voltage and frequency. In addition, electroluminescent lamps of the so-called ceramic type (that is, those lamps not incorporating plastic dielectric material) normally display a relatively low initial brightness, apparently because of a deleterious effect on the phosphor brightness when the finely-divided phosphor and embedding glass are fired together. It would be desirable to provide a ceramic-type electroluminescent lamp wherein the phosphor is not embedded in ceramic material, so that the initial brightness of such a lamp could be maintained at a high level.

It is the general object of this invention to avoid and overcome the foregoing and other difficulties of and objections to prior-art practices by the provision of a method for producing a thin film of luminescent material and the product resulting therefrom, which film has a very good luminescent response.

It is a further object to provide a method for producing on a substrate of inorganic material, thin films of electroluminescent, cathodoluminescent and photoluminescent materials which have a very good luminescent response.

It is a further object to provide a method for making a thin film of electroluminescent phosphor on a light-transmitting, electrically-conducting layer which is carried on a glass substrate.

It is still another object to provide specific method details for making improved films of luminescent material.

The aforesaid objects of the invention, and other objects which will become apparent as the description proceeds, are achieved by providing an improved method for forming thin light-transmitting luminescent films, as well as the resulting product. In practicing this method there is first vaporized onto a substrate a thin film of substance which at least principally comprises the matrix component of the preselected luminescent material desired to be formed as a thin film. Thereafter there is placed about and in contact with the formed thin film, finely-divided material which principally comprises the matrix component of the preselected luminescent material and which also includes necessary activator impurity substance in about the same proportions in which such impurity substance is normally added as activator to the raw mix in preparing the preselected luminescent material in finely-divided form. The formed thin film and finely-divided material which is packed thereabout is then fired at a predetermined temperature which at least approaches the firing temperature normally used in making the preselected luminescent material in finely-divided form. This renders the formed thin film very brightly luminescent. After firing, the formed luminescent thin film and the substrate which supports same are separated from residual finely-divided contacting material.

For a better understanding of the invention, reference should be had to the accompanying drawings wherein:

FIG. 1 is an elevational view, partly in section, of an apparatus for initially depositing as a continuous thin film the matrix component of preselected luminescent material;

FIG. 2 is a sectional elevational view illustrating an apparatus embodiment used in the powder firing step for the first-formed thin film, which firing renders the thin film brightly luminescent;

FIG. 3 is a sectional elevational view illustrating an apparatus embodiment used in powder firing a thin film previously formed on a soft glass face plate for a cathode ray tube, which powder firing renders the formed thin film brightly cathodoluminescent;

FIG. 4 is a sectional elevational view of an electroluminescent cell comprising spaced electrodes and incorporating therebetween a thin continuous film of electroluminescent phosphor;

FIG. 5 is a sectional elevational view of an electroluminescent cell wherein a thin film of electroluminescent material is carried on a layer of very high dielectric constant material, which layer in turn is carried on a metallic foundation or substrate;

FIG. 6 is an alternative embodiment of an electroluminescent cell wherein the light-transmitting electrode of the cell is formed of a metallic mesh;

Figure 7:
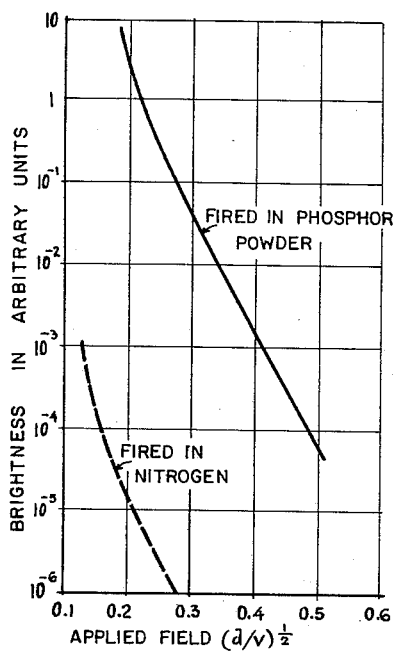
FIG. 7 represents a graph of brightness in arbitrary units versus applied field, illustrating the improved performance characteristics which are obtained with thin films prepared in accordance with the present method.

With specific reference to an apparatus embodiment which is used in carrying out the present method, in FIG. 1 is shown an apparatus 10 which is used to deposit onto an inorganic substrate a thin film of substance which at least principally comprises the matrix component of the preselected luminescent material desired to be formed as a thin, continuous film. In explanation of the term "matrix," the usual luminescent materials are formed of non-luminescent crystals of preselected materials, such as zinc sulfide or zinc silicate for example. These crystals are called the "host crystal," "base material" or "matrix" and to the matrix is added a relatively small proportion of luminescence-promoting substance which is called the activator. The matrix and activator are normally separated by a colon which indicates variable generally non-stoichiometric proportions for the activator. The apparatus 10 comprises a conventional bell jar 12 which is supported on a non-conducting foundation 14. An evacuating tube 16 is sealed through the foundation 14 and opens into the bell jar 12 and the tube 16 is connected at its other end to a conventional vacuum pump (not shown). A supporting spider 18 is provided within the bell jar 10 to support a shaft 20 and connected retaining plate 22, which is adapted to retain the inorganic substrate 24 desired to be coated. Rotational drive for the shaft 20 is provided by a conventional motor 26 coupled to the shaft 20 by a conventional magnetic coupling 28.

The material which is to be evaporated onto the substrate is contained within a metallic boat 30 fabricated of a stable metal such as tantalum for example. Supporting electrodes 32 electrically connect to and support the boat 30 at its ends. The electrodes 32 are connected in series with a source of A.C. potential, a rheostat 34 and an ammeter 36 to enable the boat 30 to be heated to a predetermined temperature. The temperature of the boat 30 can be readily correlated against the current reading of the ammeter 36.

Preparatory to coating the substrate 24 with a thin film of phosphor matrix material, the substrate 24 is thoroughly cleaned so as to remove substantially all surface impurities therefrom. Thereafter the substrate 24 is affixed to the retaining plate 22. As a specific example, the substrate can be fabricated of a glass having a coefficient of expansion of about $64 \times 10^{-7}$. If an electroluminescent phosphor film is to be deposited, the glass substrate desirably carries thereon a thin layer 37 of light-transmitting, electrically-conducting material such as tin oxide and such light-transmitting electrode coatings are well known. The distance between the tantalum boat 30 and the substrate to be coated is desirably about three inches for the specific example as given herein. In the initial evaporation, it is only necessary to evaporate a thin film of the substance which forms the matrix component of the preselected luminescent material which is intended to be formed as a thin film. As an example, if it is desired to form a thin film of zinc sulfide phosphor, such phosphor material in powdered form can be placed into the boat 30 or pure zinc sulfide can be placed into the boat 30. In the case of pure zinc sulfide, only this material as such will be deposited as a thin film during the initial evaporation process. In the case copper-activated zinc sulfide phosphor, for example, is placed into the boat 30, some copper activator and necessary coactivator material may be carried through and evaporated onto the substrate along with the basic matrix zinc sulfide constituent. As an example, the tantalum boat 30 is formed as a trough two inches long, one-quarter inch wide and one-quarter inch deep and the boat is preferably wound with a two-mil tungsten wire 38 after the material to be evaporated is placed therein, the purpose of the wire 38 being to retain the solid matrix material within the boat 30 until the matrix material is evaporated. The bell jar 12 is evacuated to a pressure of about $10^{-4}$ mm. mercury and the boat 30 is heated rapidly to a temperature of from 1200° C. to 1400° C. for example. The degree of evacuation is not critical provided the heated matrix is vaporized. The temperature to which the boat 30 is heated is not critical and may be varied over a wide range such as from 1200° C. to about 2000° C. in the case of zinc sulfide, with the higher the temperature, the faster the rate of evaporation of this material. In addition, different matrix materials require different temperatures to effect a rapid evaporization. The substrate 24 is rotated at a rate of 20 r.p.m. for example throughout the evaporation process so that the evaporated material is deposited in a substantially uniform fashion and the evaporation and rotation are continued until a matrix material film 40 of predetermined thickness is obtained. In the case of deposited zinc sulfide matrix material, the evaporation is continued until the film has a thickness of approximately 2 microns, which is readily determined by orders of interference patterns. As an example, for the foregoing conditions of deposition, a zinc sulfide film having a thickness of two microns will be obtained in approximately 15 seconds. It should be understood that the thickness of this first-formed film is not critical and can be varied over a wide range. The temperature of the substrate 24 during the evaporation of the film of matrix material is not critical and can be varied from room temperature for example up to such temperature as will cause the deposited film of matrix material to be re-evaporated or as will cause the substrate 24 to soften. In some cases, higher temperatures for the substrate during the deposition of the matrix material will improve the adherence of the resulting film 40 to the substrate 24.

After the film of matrix material has been deposited on the substrate 24, the deposited film 40 as shown in FIG. 2 has placed thereabout and in contact therewith finely-divided or powdered material which principally comprises the matrix component of the preselected luminescent material of which the luminescent film is to be formed and which finely-divided material also includes necessary activator impurity substance in about the same proportions in which such impurity substance is normally added as activator to the raw mix in preparing the preselected luminescent material in finely-divided form. Otherwise expressed, the finely-divided material which is packed about the formed thin film can either be the raw mix as is normally used in preparing the preselected luminescent material in finely-divided form or the packed material can be the preselected phosphor in finely-divided form after it has been processed by firing the raw mix. It is preferred to use the preselected phosphor as such in finely-divided form. In the preferred manner of carrying out the present method, the substrate 24 which carries the formed thin film 40 is placed into a silica boat 42 as shown in FIG. 2 and the film and substrate are packed with the preselected luminescent material 44 in finely-divided form. The top of the boat is covered with a snug fitting silica cover 46 and the boat 42 is placed into a conventional firing furnace 48. The firing atmosphere in the furnace can be varied and it is convenient to use an air atmosphere, although nitrogen or other atmospheres can be substituted therefor. The firing temperature is selected so that it at least approaches that firing temperature which is normally used in preparing the preselected luminescent material in finely-divided form. In the case of copper-activated zinc sulfide electroluminescent phosphor, the usual firing temperatures are from about 800 to 1100° C. When firing the thin films of zinc sulfide matrix having the preselected zinc sulfide phosphor powder packed thereabout, the firing temperature should be at least about 700° C. and it is preferred to use a firing temperature of about 750° C. The firing time is not critical and can be varied and as an example, the foregoing zinc sulfide matrix which has activated zinc sulfide electroluminescent phosphor packed thereabout is fired at 750° C. for a period of 15 minutes. After firing, the film and substrate are cooled with the finely-divided phosphor packed thereabout and thereafter removed from the silica boat 42 and washed in water to remove any residual finely-divided material.

In processing powdered luminescent materials from the raw mix, the maximum firing temperature which can be used in preparation is normally governed by the formation of an excessively hard cake of phosphor which is difficult to reduce to finely-divided form. With respect to forming thin films of phosphor in accordance with the present method, the problem of forming an excessively sintered film layer is not present. However, in preparing the present films, the maximum firing temperature which is used in the powder firing step of the previously-formed matrix film usually should not appreciably exceed the firing temperature which is normally used in making the same preselected luminescent material in finely-divided or powdered form since the packed finely-divided material may tend to sinter excessively, thereby making removal of the substrate and thin film difficult. In addition, a quartz substrate may devitrify when fired at excessive temperatures in the presence of material such as zinc sulfide.

Apparently the powder firing step for the first-formed thin film sets up a favorable diffusion equilibrium between the first-formed matrix material film and the surrounding powder, thereby enabling the first-formed film to assimilate concentrations of activator and coactivator, if one is required, for good luminescence and similar to those activator concentrations which are present in the surrounding powder. For this reason it is desired that the activator impurity substance be present in the powder in about the same proportions in which the activator impurity substance is normally added to the raw mix when preparing the preselected luminescent material in finely-divided form. Some deviations are possible, however, and a good luminescent thin film can still be formed. As an example, in forming thin films of copper-activated zinc sulfide electroluminescent phosphor, the first-formed zinc sulfide matrix film can be packed with powdered copper-activated zinc sulfide phosphor which has previously been washed to remove excess copper therefrom. The resulting film will still have good electroluminescent brightness. It is preferred, however, to pack the first fired zinc sulfide matrix film with powdered copper-activated zinc sulfide electroluminescent phosphor which has not been washed to remove any excess copper therefrom.

If the substrate is not adequately supported during the film firing step, the film firing temperature should be less than the softening temperature of the substrate. In the case of a glass substrate, the softening temperature is an arbitrary point on the smooth temperature-viscosity curve and is defined as that temperature at which the glass has a viscosity of approximately $10^{7.65}$ poises. This softening temperature varies from glass to glass, with so-called soft glasses having a lower softening temperature than hard glasses and with quartz having a still-higher softening temperature. The softening temperature of the glass substrate can be somewhat exceeded, however, if the substrate is adequately supported during the powder firing step so that it will not deform. The same general limitations apply to a metallic substrate. In FIG. 3 is illustrated a soft glass face-plate 50 for a cathode ray tube which has previously had deposited thereon a thin film 52 of cathodoluminescent phosphor matrix material in accordance with the present method. Some preselected luminescent material in powdered form is placed into a steel crucible 54 and the faceplate 50 supported thereby at all points. Additional preselected luminescent material 56 in finely-divided form is then packed about and in contact with the entire faceplate 50. The assembly is covered with a fused silica lid 58 and fired as in the previous example. Under such conditions of firing, the supported soft glass faceplate or substrate 50 can be fired at a temperature which is somewhat greater than though not appreciably exceeding the softening point for the glass comprising the faceplate. As an example, in the case of a glass having a softening temperature of about 870° C., a film firing temperature of 920° C. will produce a good luminescent film although it is somewhat frosted. At appreciably higher temperatures, some troubles may be encountered with the powder sticking to the film after firing. The amount by which the film firing temperature can exceed the softening temperature for an adequately supported vitreous substrate will vary depending on the glass.

In the case the thin films are to be used as a part of an electroluminescent cell, the coefficient of expansion for the substrate is a factor which should be considered. Suitable films of electroluminescent phosphor can be deposited on glass substrates having coefficients of thermal expansion varying from $5 \times 10^{-7}$ to $110 \times 10^{-7}$ cm./cm./° C. At the extremes of these coefficients, a zinc sulfide film which has a coefficient of approximately $65 \times 10^{-7}$ will tend to develop incipient cracks. Also, some film wrinkles may be present where a soft glass is used. Cracks and wrinkles can be filled in with a suitable filler plastic after the film has been fabricated. For best results, the glass substrate should have a coefficient of expansion of from $50 \times 10^{-7}$ to $80 \times 10^{-7}$. Such glasses are well known and are commercially available.

The present method is suitable for forming a thin film of any electroluminescent phosphor and is particularly suitable for forming electroluminescent thin films of the zinc sulfide system. Among others these include zinc sulfide phosphors which are activated by copper and coactivated by chlorine, such phosphors activated by copper and manganese and coactivated by chlorine and zinc-cadmium sulfides with copper activator. Specific details for praparing different electroluminescent phosphors in finely-divided form are given in copending application S.N. 732,510, filed May 2, 1958, now Patent No. 2,972,692, and owned by the present assignee. The present method can also be used to form thin films of many different preselected phosphors which are either cathodoluminescent or photoluminescent, or both. In the following table, designated Table I, is given a partial listing of phosphors which have been deposited as thin films, along with the phosphor performance characteristics and film processing conditions. In the usual case, the firing temperature for the first-formed film and packed powder should be at least about 70% of the firing temperature normally used in making such luminescent material in powdered form. As indicated hereinbefore, the film firing temperature should not appreciably exceed that firing temperature normally used in making the luminescent material in finely-divided form.

Table I

| Phosphor | Cathodo-luminescent Color | Photoluminescent Color | Evaporation Temperature used in forming matrix film, °C. | Firing Temperature of formed film and powder, °C. |
|---|---|---|---|---|
| (ZnCd)S:Ag | Blue green to red depending on Zn-Cd ratio and activator concentration. | Same | 1,300 | 750 |
| (ZnCd)S:Cu | Green to orange depending on Zn-Cd ratio and activator concentration. | Same | 1,300 | 750 |
| ZnS:Cu:Mn | Yellow | Yellow | 1,300 | 750 |
| ZnS:Cu | Blue | Green | 1,300 | 750 |
| ZnS:Mn | Yellow | | 1,300 | 750 |
| ZnS:Ag | Blue | Blue | 1,300 | 750 |
| $Zn_2B_2O_5$ | Yellow | Yellow | 1,200 | 800 |
| $3.5MgO \cdot MgF_2 \cdot GeO_2$:Mn | Red | | 1,300 | 900 |
| $Zn_2SiO_4$:Mn | Green | Green | 1,500 | 1,100 |
| $CdSiO_3$ | Red-Orange | | 1,500 | 750 to 1,200 |
| $CdBO_3$ | Red-Orange | | 850 | 750 |
| ZnO:Zn | Green-Blue | | 1,200 | 900 |
| $Zn_3(PO_4)_2$:Mn | Orange | | 1,200 | 750 |
| 4,500° K. halophosphate | Yellow | | 1,200 | 800 |

In the foregoing Table I, the phosphor materials which are normally photoluminescent in finely-divided form are photoluminescent in thin film form if the films are made sufficiently thick to absorb the ultraviolet radiations. This can be readily accomplished by repeating the film-forming processing to form a plurality of superimposed films, polishing each film layer after it is formed. This same procedure can be used to form zinc sulfide electroluminescent thin films which have a thickness considerably greater than 2 microns.

In FIG. 4 is illustrated an electroluminescent cell 60 which comprises a glass foundation 62 having a coefficient of thermal expansion of approximately $64 \times 10^{-7}$, a light-transmitting, electrically-conducting layer of tin oxide 64 carried thereon, a thin film 66 of electroluminescent zinc sulfide phosphor activated by copper and coactvated by chlorine and formed by the method as indicated hereinbefore carried over the electrode 64 and a vacuum-metallized aluminum electrode 68 carried over the phosphor thin film 66. Since no additional dielectric layer or admixed dielectric material is utilized, the cell 60 can be energized to electroluminescence by either A.C. or D.C. potential.

In FIG. 5 is illustrated an alternative cell construction 70 wherein an additional layer of material having a very high dielectric constant is first fabricated on a metallic foundation 72. As an example, a thin film 74 of barium titanate having a dielectric constant of over 250 is first formed on the metallic substrate 72 in accordance with the technique disclosed by Feldman, "Review of Scientific Instruments," volume 26, page 463 (1955). A thin phosphor film 76 of zinc sulfide electroluminescent material is formed on the barium titanate layer 74 in accordance with the present method and a light-transmitting electrode coating 78 such as tin oxide formed directly on the phosphor film 76 by conventional techniques. A glass protecting layer 80 can then be formed directly on the light-transmitting electrode 78. Such an electroluminescent cell will have excellent electrical breakdown characteristics because of the additional barium titanate layer 74 which is included between the electrodes and the cell brightness will still be excellent, inasmuch as very little electric field drop occurs across the barium titanate layer 74. Other suitable high dielectric constant materials such as titania can be substituted for the barium titanate.

In FIG. 6 is illustrated a further alternative cell embodiment 82 which comprises a glass substrate 84 which carries thereon a light-transmitting wire-mesh-type electrode 86. The phosphor film 88 is formed directly on the wire electrode 86 in accordance with the present method. Included thereover is powdered barium titanate mixed with a small amount of glass or plastic dielectric material such as polyvinyl-chloride acetate to form a separate layer 90 having a very high dielectric constant and an electrode layer 92 of aluminum is formed directly thereover. As a possible alternative construction, the wire mesh electrode as shown in FIG. 6 could be replaced by an interlacing, raster-type grid mesh as shown in FIG. 3 of U.S. Patent No. 2,684,450, dated July 20, 1954 and the thin phosphor film deposited directly thereon.

Because of the very thin films of efficient electroluminescent phosphor material which can be formed by the present method, very high fields can be obtained with relatively low voltage excitation. As an example, with electroluminescent cells fabricated as illustrated in FIG. 4, and energized with 120 volts and 60 cycles, brightnesses up to 30 ft. lamberts can be obtained. This approaches the tentative value of 50 to 100 ft. lamberts which is desired in order to make electroluminescence competitive as a general lighting source. It should be noted that primarily because of the extreme thinness of the present electroluminescent films, they are about 50 times brighter volume for volume than a typical electroluminescent lamp which incorporates the same phosphor in finely-divided form. With the addition of a separate layer of very high dielectric constant material such as barium titanate or titania, the present thin films can be incorporated in electroluminescent cells having relatively-high voltage breakdown characteristics and a good brightness can still be obtained since relatively little electric field is lost through the separate layer of high dielectric constant material.

The best thin films of luminescent material previously reported are made by the process described by Feldman and O'Hara in "Journal of the Optical Society of America," vol. 47, page 300 (1957). In accordance with the Feldman and O'Hara process, the luminescent material itself is evaporated as a thin film and the formed thin film is thereafter fired in a vacuum or other atmospheres at a temperature approximating the temperature normally used in preparing the phosphor in finely-divided form. Using the process of Feldman and O'Hara, a limited number of phosphors have been formed as cathodoluminescent thin films, but when this process was used to form zinc sulfide thin films, the electroluminescent response was quite poor. In FIG. 7 are illustrated electroluminescent thin film performance curves, wherein brightness in arbitrary units is plotted versus applied field expressed as the square root of the film thickness divided by the voltage. With such an expression of applied field, thickness variations encountered from cell to cell are eliminated as a factor in any comparison. In the curves as shown in FIG. 7, the performance characteristics of electroluminescent phosphor films prepared in accordance with the present method are shown as a solid line and the performance characteristics of otherwise-identical films fired in nitrogen and otherwise prepared in accordance with the foregoing process of Feldman and O'Hara are shown as a broken line. When preparing electroluminescent thin films generally in accordance with the foregoing process of Feldman and O'Hara, the nitrogen atmosphere for the film firing was found to be at least as good as other atmospheres. As illustrated, thin films formed by the present method display a maximum brightness approximately ten thousand times greater than the comparison films.

Figure 8:
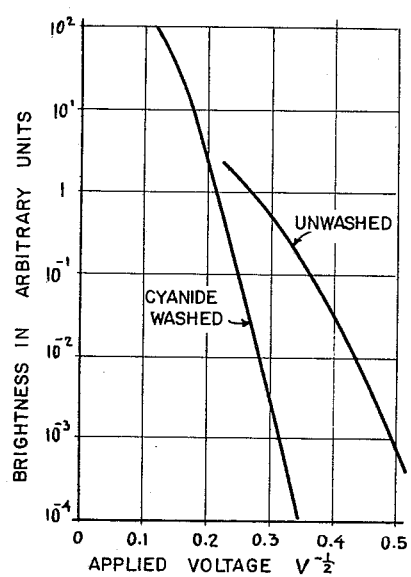
FIG. 8 is a graph of brightness in arbitrary units versus applied voltage, illustrating the beneficial effects to be derived from washing the present thin films in an alkali cyanide solution.

Electroluminescent thin films formed by the present method will display increased output at higher field strengths when, after firing in the powder, they are washed in a solution which removes any excess copper, examples of such suitable washing solutions being water solutions of alkali cyanides, thiocyanates or thiosulphates. As a specific example, any of the formed electroluminescent thin films can be washed in a water solution containing 10% by weight sodium cyanide and 5% by weight sodium hydroxide. The concentration of the washing material can be varied. The improvement to be obtained through such a washing is shown in FIG. 8 and as illustrated, the electroluminescent brightness at higher field strengths is improved by a factor of about ten.

Figure 9:
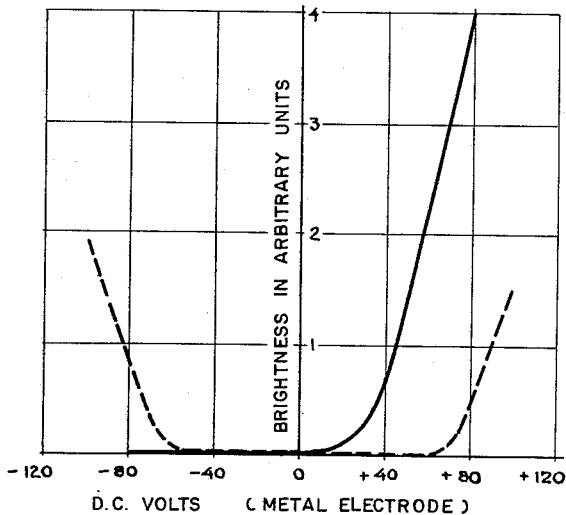
FIG. 9 is a graph of brightness in arbitrary units versus D.C. applied volts excitation for an electroluminescent cell fabricated as in the embodiment shown in FIG. 4.

The electroluminescent cell embodiment as shown in FIG. 4, which incorporates only the thin film of electroluminescent phosphor between the spaced electrodes, can be energized by either A.C. or D.C. excitation. In the case of D.C. excitation, the response is usually better when the aluminum or heavy metal electrode is positive, but with some phosphors it does not matter whether the aluminum or the tin oxide electrode is made positive. These characteristics are shown in FIG. 9 wherein brightness in arbitrary units is plotted versus D.C. volts applied to the metal electrode for a cell embodiment of FIG. 4. As illustrated, a yellow zinc sulfide electroluminescent phosphor activated by copper and manganese and coactivated by chlorine, shown as a solid curve, displays an unsymmetrical output while a blue electroluminescent zinc sulfide phosphor activated by copper and coactivated by chlorine, shown as a broken curve, discloses a symmetrical output with respect to the polarity of the metal electrode.

As a possible alternative embodiment, thin films of different luminescent material can be superimposed on top of one another so as to obtain varying color blends. As another possible embodiment, different electroluminescent phosphor thin films can be included between the spaced electrodes of the cell with an additional layer of high dielectric constant material included between the separate films.

Thin films of a cathodoluminescent phosphor which are formed in accordance with the present invention are very efficient under excitation by low voltage electrons. Such films are thus particularly suited for use with cathodoluminescent type lamps such as generally illustrated in U.S. Patent No. 2,177,705, dated October 31, 1939, or with combination cathodoluminescent-type lamps such as illustrated in U.S. Patent No. 2,759,119, dated August 14, 1956. Since the films can be made transparent or at least substantially transparent, the visible light which is emitted by an incandescent filament, for example, is not absorbed to any appreciable degree by the film and simultaneously, the film is very efficiently excited to luminescence by the low voltage electrons which are emitted by a tungsten filament or other emitting source.

It will be recognized that the objects of the invention have been achieved by providing a method for producing a thin film of luminescent material which has very good luminescent response, as well as the product resulting therefrom. Such films can be formed of electroluminescent, cathodoluminescent or photoluminescent material on a substrate and electroluminescent thin films can be formed directly on an electrically conducting layer which is carried on a glass substrate. In addition, there have been provided specific method details for making improved films of luminescent materials.

While best embodiments have been illustrated and described in detail, it is to be particularly understood that the invention is not limited thereto or thereby.

I claim:

1. The method of forming on a light-transmitting, electrically-conducting layer carried on a glass substrate, a thin, continuous, light-transmitting film of preselected electroluminescent material, which method comprises: vacuum evaporating a thin film of substance at least principally comprising the matrix component of said preselected electroluminescent material onto a light-transmitting, electrically-conducting layer carried on a glass substrate; placing about and in contact with the formed thin film, finely-divided material principally comprising the matrix component of said preselected electroluminescent material and also including activator impurity substance in about the proportions in which such impurity substance is normally added as activator impurity to the raw mix in preparing said preselected electroluminescent material in finely-divided form; firing for a predetermined time the formed thin film, supporting substrate and contacting finely-divided material at a predetermined temperature at least approaching the firing temperature normally used in making said preselected electroluminescent material in finely-divided form and less than the temperature at which said substrate will soften, to render said formed film electroluminescent; and thereafter separating the fired electroluminescent thin film and supporting substrate from residual finely-divided contacting material.

2. The method of forming on a light-transmitting, electrically-conducting layer carried on a glass substrate, a thin, continuous, light-transmitting film of preselected electroluminescent material, which method comprises: vacuum evaporating a thin film of substance at least principally comprising the matrix component of said preselected electroluminescent material onto a light-transmitting, electrically-conducting layer carried on a glass substrate; placing about and in contact with the formed thin film, said preselected electroluminescent material in finely-divided form; firing for a predetermined time the formed thin film, supporting substrate and contacting finely-divided electroluminescent material at a predetermined temperature at least approaching the firing temperature normally used in making said preselected luminescent material in finely-divided form and less than the temperature at which said substrate will soften, to render said formed film electroluminescent; and thereafter separating the fired electroluminescent thin film and supporting substrate from residual finely-divided contacting electroluminescent material.

3. The method of forming a thin, continuous, light-transmitting film of preselected zinc sulfide electroluminescent phosphor on a light-transmitting, electrically-conducting layer carried on a glass substrate, which method comprises: vacuum evaporating a thin film of substance at least principally comprising zinc sulfide onto a light-transmitting, electrically-conducting layer carried on a glass substrate having a coefficient of thermal expansion of from $5 \times 10^{-7}$ to $110 \times 10^{-7}$; placing about and in contact with the formed thin film, finely-divided material chemically including zinc sulfide as a major component thereof and also including activator impurity substance in about the proportions in which such impurity substance is normally added as activator impurity to the raw mix in preparing in finely-divided form said preselected electroluminescent phosphor; firing for a predetermined time the formed thin film, supporting substrate and contacting finely-divided material at a temperature of at least about 700° C. and less than the softening temperature of the vitreous substrate to render said formed thin film electroluminescent; and thereafter separating the fired electroluminescent thin film and supporting substrate from residual finely-divided contacting material.

4. The method of forming a thin, continuous, light-transmitting film of preselected zinc sulfide electroluminescent phosphor on a light-transmitting, electrically-conducting layer carried on a glass substrate, which method comprises: vacuum evaporating a thin film of substance at least principally comprising zinc sulfide onto a light-transmitting, electrically-conducting layer carried on a glass substrate having a coefficient of thermal expansion of from $5 \times 10^{-7}$ to $110 \times 10^{-7}$; placing about and in contact with the formed thin film, said preselected electroluminescent phosphor in finely-divided form; firing for a predetermined time the formed thin film, supporting substrate and contacting finely-divided electroluminescent phosphor at a temperature of at least about 700° C. and less than the softening temperature of the vitreous substrate, to render said formed thin film electroluminescent; and thereafter separating the fired electroluminescent thin film and supporting substrate from residual finely-divided contacting electroluminescent phosphor.

5. The method of forming a thin, continuous, light-transmitting film of preselected electroluminescent phosphor on a light-transmitting, electrically-conducting tin oxide layer carried on a glass substrate, which method comprises: vacuum evaporating a thin film of substance at least principally comprising zinc sulfide onto a light-transmitting, electrically-conducting tin oxide layer carried on a glass substrate having a coefficient of thermal expansion of from $50 \times 10^{-7}$ to $80 \times 10^{-7}$; placing about and in contact with the formed thin film, said preselected electroluminescent phosphor in finely-divided form; firing for a predetermined time the formed thin film, supporting substrate and contacting finely-divided electroluminescent phosphor at a temperature of about 750° C., to render said formed thin film electroluminescent; and thereafter separating the fired electroluminescent thin film and supporting substrate from residual finely-divided contacting electroluminescent phosphor.

6. The method of forming on a light-transmitting, electrically-conducting layer carried on a glass substrate, a thin, continuous, light-transmitting film of preselected zinc sulfide electroluminescent phosphor including copper as activator, which method comprises: vacuum evaporating substance at least principally comprising zinc sulfide onto a light-transmitting, electrically-conducting layer carried on a vitreous substrate having a coefficient of thermal expansion of from $5 \times 10^{-7}$ to $110 \times 10^{-7}$, by heating such substance in vacuum and in the presence of the conducting-layer-carrying substrate at a predetermined temperature and for a predetermined time to cause such heated substance to vaporize and deposit onto the conducting layer as a thin film of predetermined thickness; placing about and in contact with the formed thin film, said preselected zinc sulfide electroluminescent phosphor in finely-divided form; supporting said substrate so that it will not deform if its softening temperature is exceeded; firing for a predetermined time the formed thin film, supporting substrate and contacting finely-divided phosphor at a temperature of at least about 700° C. and not appreciably exceeding the softening temperature of the vitreous substrate to render said formed thin film electroluminescent; and thereafter separating the fired luminescent thin film and supporting substrate from residual finely-divided contacting electroluminescent phosphor.

7. The method of forming a thin, continuous, light-transmitting zinc sulfide electroluminescent phosphor film on a light-transmitting, electrically-conducting tin oxide layer carried on a glass substrate, which method comprises: vacuum evaporating substance at least principally comprising zinc sulfide onto a light-transmitting, electrically-conducting tin oxide layer carried on a vitreous substrate having a coefficient of thermal expansion of from $50 \times 10^{-7}$ to $80 \times 10^{-7}$ by heating such substance in vacuum and in the presence of the conducting-layer-carrying substrate at a predetermined temperature and for a predetermined time to cause such heated substance to vaporize and deposit onto the conducting layer as a thin film of predetermined thickness; placing about and in contact with the formed thin film, finely-divided copper-activated zinc sulfide electroluminescent phosphor; supporting said substrate so that it will not deform if its softening temperature is exceeded; firing for a predetermined time the formed thin film, supporting substrate and contacting finely-divided material at a temperature of at least about 700° C. and not appreciably exceeding the softening temperature of the vitreous substrate to render said formed thin film electroluminescent; and thereafter separating the fired luminescent thin film and supporting substrate from residual finely-divided contacting electroluminescent material.

8. The method of forming a thin, continuous, light-transmitting zinc sulfide electroluminescent phosphor film on an inorganic substrate, which method comprises: vacuum evaporating substance at least principally comprising zinc sulfide onto an inorganic substrate by heating such substance in vacuum at a temperature of from about 1200° C. to 2000° C. and in the presence of the substrate for a predetermined time to cause such heated substance to vaporize and deposit onto the substrate as a thin film of predetermined thickness; placing about and in contact with the formed thin film, finely-divided copper-activated zinc sulfide electroluminescent phosphor; supporting said substrate so that it will not deform if its softening temperature is exceeded; firing for a predetermined time the formed thin film, supporting substrate and contacting finely-divided material at a temperature of at least about 700° C. and not appreciably exceeding the softening temperature of the substrate to render said formed thin film electroluminescent; and thereafter separating the fired luminescent thin film and supporting substrate from residual finely-divided contacting electroluminescent material.

9. The method of forming on an inorganic substrate a thin, continuous, light-transmitting film of preselected electroluminescent material, which method comprises: vacuum evaporating onto an inorganic substrate a thin film of substance at least principally comprising the matrix component of said preselected electroluminescent material; placing about and in contact with the formed thin film, finely-divided material principally comprising the matrix component of said preselected electroluminescent material and also including necessary activator impurity substance in about the proportions in which such impurity substance is normally added as activator to the raw mix in preparing said preselected electroluminescent material in finely-divided form; supporting said substrate so that it will not deform if its softening temperature is exceeded; firing for a predetermined time the formed thin film, supporting substrate and contacting finely-divided material at a predetermined temperature at least about 700° C. and at least about 70% of the firing temperature normally used in making said preselected electroluminescent material in finely-divided form, with the film firing temperature not appreciably exceeding that temperature at which said substrate will soften and not appreciably exceeding the firing temperature normally used in making said preselected electroluminescent material in finely-divided form, to render said formed film electroluminescent; and thereafter separating the fired electroluminescent thin film and supporting substrate from residual finely-divided contacting material.

10. The method of forming on an inorganic substrate a thin, continuous, light-transmitting film of preselected zinc sulfide electroluminescent phosphor including copper as activator, which method comprises: vacuum evaporating onto an inorganic substrate a thin film at least principally comprising zinc sulfide; placing about and in contact wtih the formed thin film, said preselected electroluminescent phosphor in finely-divided form; supporting said substrate so that it will not deform if its softening temperature is exceeded; firing for a predetermined time the formed thin film, supporting substrate and contacting finely-divided electroluminescent phosphor at a predetermined temperature of at least about 700° C. and not appreciably exceeding the temperature at which said substrate will soften, to render said formed film electroluminescent; separating the fired electroluminescent thin film and supporting substrate from residual finely-divided contacting electroluminescent phosphor; and washing the electroluminescent film in a solution which removes any excess copper from the formed film.

11. The method of forming on an inorganic substrate a thin, continuous, light-transmitting film of preselected zinc sulfide electroluminescent phosphor including copper as activator, which method comprises: vacuum evaporating onto an inorganic substrate a thin film at least principally comprising zinc sulfide; placing about and in contact with the formed thin film, said preselected electroluminescent phosphor in finely-divided form; supporting said substrate so that it will not deform if its softening temperature is exceeded; firing for a predetermined time the formed thin film, supporting substrate and contacting finely-divided electroluminescent phosphor at a predetermined temperature of at least about 700° C. and not appreciably exceeding the temperature at which said substrate will soften, to render said formed thin film electroluminescent; separating the fired electroluminescent thin film and the supporting substrate from residual finely-divided contacting electroluminescent phosphor; and washing the electroluminescent film in an aqueous alkali cyanide solution.

12. The method of forming on an inorganic substrate a thin, continuous, light-transmitting film of preselected zinc sulfide electroluminescent phosphor including copper as activator, which method comprises: vacuum evaporating onto an inorganic substrate a thin film at least principally comprising zinc sulfide; placing about and in contact with the formed thin film, said preselected electroluminescent material in finely-divided form and previously unwashed with any copper-removing solution; supporting said substrate so that it will not deform if its softening temperature is exceeded; firing for a predetermined time the formed thin film, supporting substrate and contacting finely-divided electroluminescent phosphor at a predetermined temperature of at least about 700° C. and not appreciably exceeding the temperature at which said substrate will soften, to render said formed film electroluminescent; and thereafter separating the fired electroluminescent thin film and supporting substrate from residual finely-divided contacting electroluminescent phosphor.

References Cited in the file of this patent

UNITED STATES PATENTS

| | | |
|---|---|---|
| 2,675,331 | Cusano et al. | Apr. 13, 1954 |
| 2,689,190 | Hushley | Sept. 14, 1954 |
| 2,720,808 | Roberts et al. | Oct. 25, 1955 |
| 2,732,313 | Cusano et al. | Jan. 24, 1956 |
| 2,798,823 | Harper | July 9, 1957 |
| 2,824,992 | Bouchard et al. | Feb. 25, 1958 |
| 2,857,541 | Etzel et al. | Oct. 21, 1958 |
| 2,867,541 | Coghill et al. | Jan. 6, 1959 |
| 2,894,854 | MacIntyre et al. | July 14, 1959 |

FOREIGN PATENTS

| | | |
|---|---|---|
| 919,727 | Germany | May 23, 1955 |